4 Sheets—Sheet 1.

F. W. CROSS.

BUTTON HOLE SEWING MACHINE.

No. 10,465. Reissued Apr. 8, 1884.

Witnesses:
E. A. Hemmenway
Walter E. Lombard

Inventor:
Frank W. Cross,
by N. C. Lombard
Attorney.

F. W. CROSS.

BUTTON HOLE SEWING MACHINE.

No. 10,465. Reissued Apr. 8, 1884.

Witnesses:
E. A. Hemmenway
Walter E. Lombard.

Inventor:
Frank W. Cross,
by N. C. Lombard
Attorney.

F. W. CROSS.

BUTTON HOLE SEWING MACHINE.

No. 10,465. Reissued Apr. 8, 1884.

Witnesses:

E. A. Hemmenway.
Walter E. Lombard.

Inventor:

Frank W. Cross,
by N. C. Lombard
Attorney.

F. W. CROSS.

BUTTON HOLE SEWING MACHINE.

No. 10,465. Reissued Apr. 8, 1884.

*Witnesses:*
E. A. Hemmenway
Walter E. Lombard

*Inventor:*
*Frank W. Cross,*
*by* N. C. Lombard
*Attorney.*

UNITED STATES PATENT OFFICE.

FRANK W. CROSS, OF LYNN, MASSACHUSETTS.

BUTTON-HOLE SEWING-MACHINE.

SPECIFICATION forming part of Reissued Letters Patent No. 10,465, dated April 8, 1884.

Original No. 279,349, dated June 12, 1883. Application for reissue filed December 1, 1883.

DIVISION A.

*To all whom it may concern:*

Be it known that I, FRANK W. CROSS, of Lynn, in the county of Essex and State of Massachusetts, have invented certain new and useful Improvements in Button-Hole Sewing-Machines, of which the following, taken in connection with the accompanying drawings, is a specification.

My invention relates to stop-motions for sewing-machines, and is primarily designed for use upon button-hole sewing-machines of that class which are provided with a clamping device for holding the work, that is arranged to be fed transversely of the machine-table and to be rotated about the needle; and my invention has for its objects a more accurate timing of the stopping of the machine at the end of the button-hole and simplifying the labor of the operator by enabling her to start the machine with the foot, thus leaving the hands free to manipulate the work; and it consists in certain novel devices and combinations and arrangements of parts, which will be best understood by reference to the description of the drawings, and to the claims to be hereinafter given.

Figure 1:
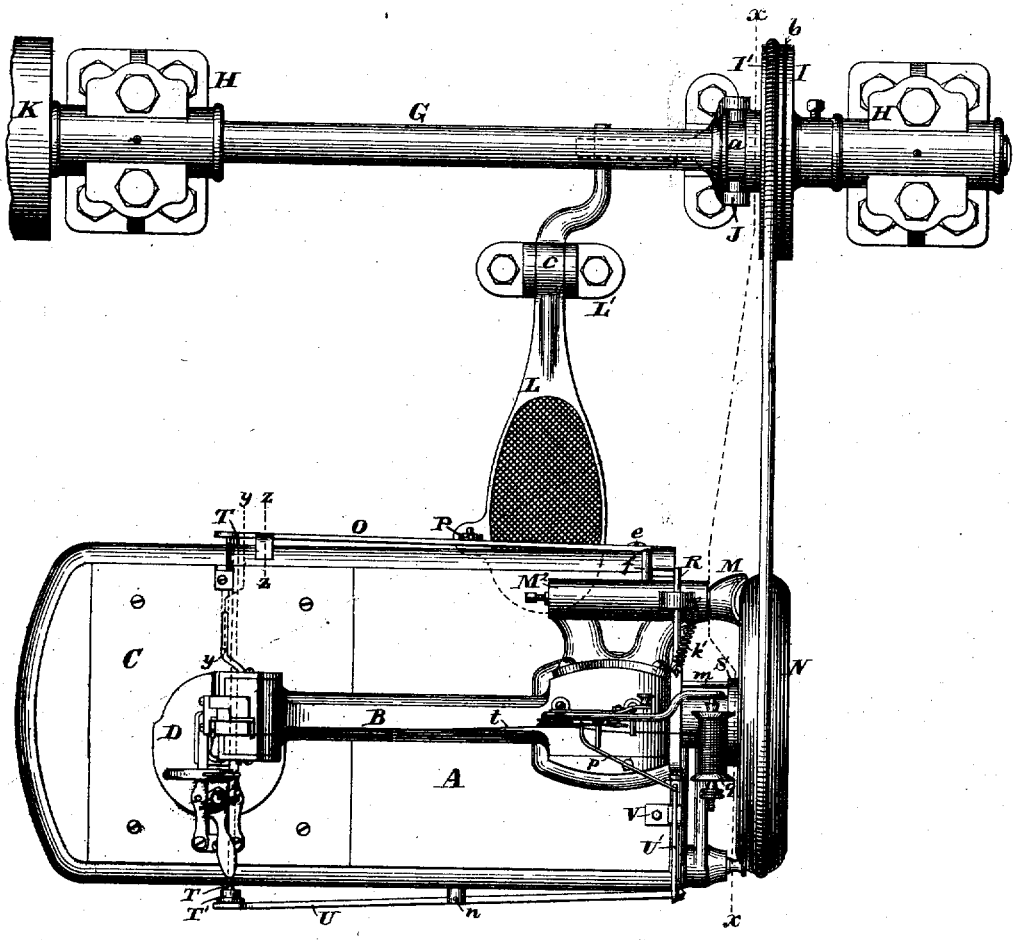
Figures 2, 10:
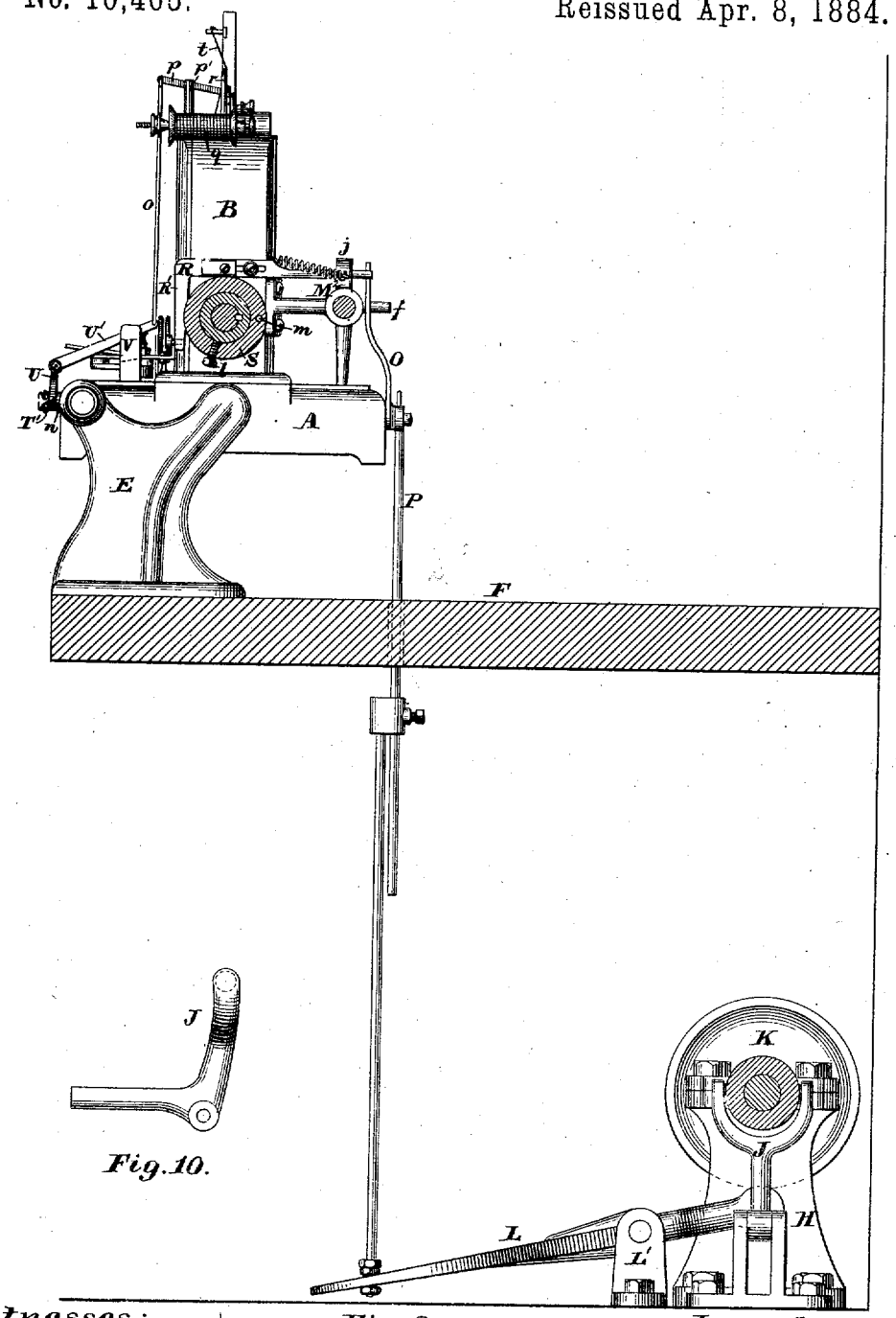
Figure 3:
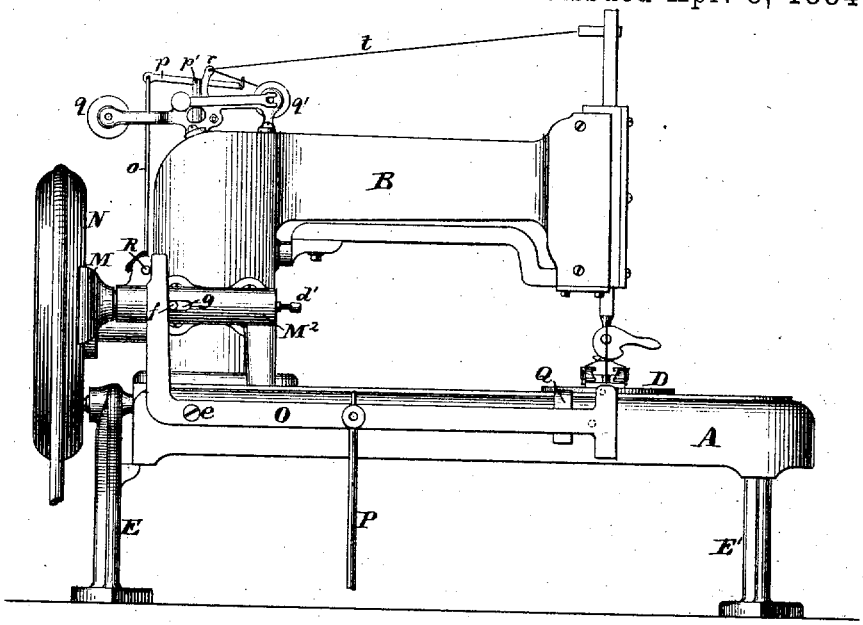
Figure 5:
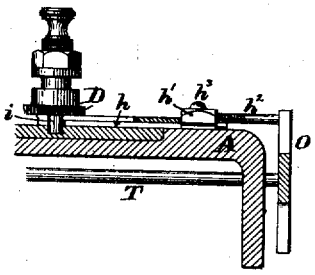
Figure 6:
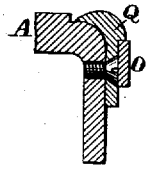
Figure 7:
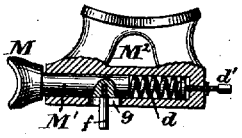
Figure 8:
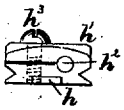
Figure 11:
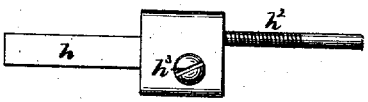
Figure 4:
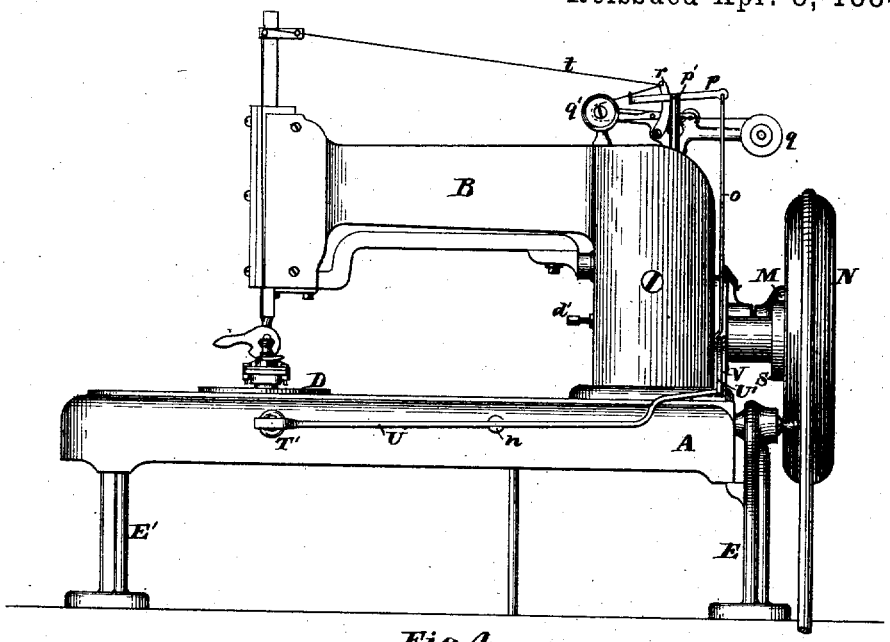
Figure 9:
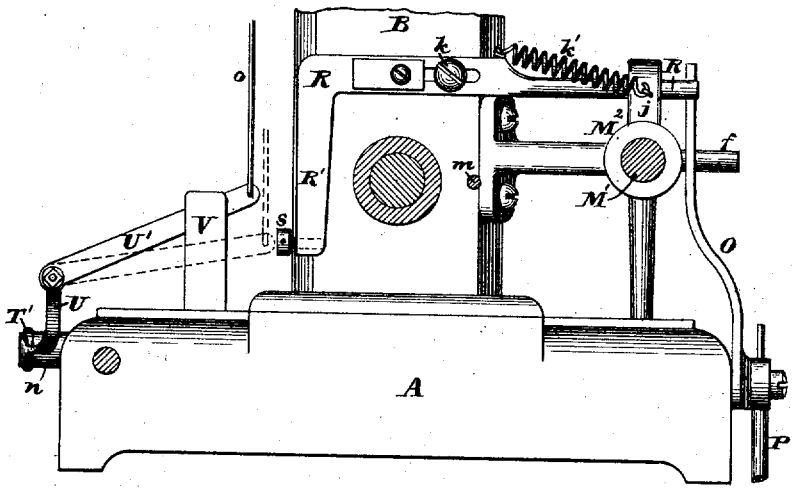

Figure 1 of the drawings is a plan of machine embodying my invention, the bench upon which the sewing-machine is supposed to be mounted, and beneath which the counter-shaft is placed, being omitted for the purpose of the better showing the several parts of the invention. Fig. 2 is a vertical transverse section on line *x x* on Fig. 1. Fig. 3 is a rear side elevation of the sewing-machine without the counter-shaft. Fig. 4 is a front side elevation. Fig. 5 is a partial section on line *y y* on Fig. 1. Fig. 6 is a partial section on line *z z* on Fig. 1. Fig. 7 is a sectional plan of the brake-shoe and its stand. Fig. 8 is an elevation of the inner end of the push-pin for releasing the brake-retracting lever. Fig. 9 is an elevation of the devices for automatically stopping the machine when the thread breaks, drawn to an enlarged scale. Fig. 10 is an elevation of the shipper-lever, and Fig. 11 is a plan of push-pin for releasing the brake-retracting lever.

A is the bed or main table, B the goose-neck, C the removable work-plate, and D the work-clamping plate, of a Singer button-hole sewing-machine. The table A is pivoted to the stands E and E′, which are firmly secured in the appropriate positions upon the bench F.

G is the counter-shaft, mounted in bearings in the stands H, secured to the floor of the building beneath the bench F, and to the rear of the back edge of the table A, as shown in Figs. 1 and 2. The shaft G has firmly secured thereon the disk I, and in near proximity thereto is mounted the grooved loose pulley I′, provided with a circumferential groove, *a*, in its hub, with which the forked end of the elbow shipper-lever J engages, as shown.

Between the pulley I′ and disk I is placed a disk of leather, *b*, to serve as a friction-pad, whereby the pulley I′ may be made to revolve with the shaft G when pressed hard toward the disk I by the action of the shipper-lever J. Motion is imparted to the shaft G by means of the pulley K and a suitable belt (not shown) leading therefrom to a main shaft or other prime mover.

L is a treadle-lever pivoted at *c* to the stand L′, and connected at its rear end to the horizontal arm of the shipper-lever J, and having its front end in a convenient position to be acted upon by the operator's foot while sitting at the machine and manipulating the work to be acted upon with his or her hands.

M is a brake-shoe, shaped to fit the side of the rim of the fly-wheel N, and mounted by its horizontal shank M′ in the stand $M^2$, secured to the back side of the goose-neck B, and pressed into contact with the wheel N by the spring *d*, the tension of which may be regulated by means of the set-screw *d′*, as shown in Fig. 7.

O is an elbow-lever, pivoted at *e* to the back edge of the table A, with its short arm projecting upward in a position to bear against the side of the pin *f*, set in the side of the shank of the brake-shoe M, and projecting through the slot *g*, formed in the stand $M^2$, all as shown in Fig. 3. The lever O is made preferably of sheet-steel, so that it may readily be sprung horizontally, and has the end of its long or horizontal arm made T-shaped, and has pivoted thereto, near the middle of its length, the connecting-rod P, the lower end of which is connected to the treadle-lever L, as shown in Fig. 2.

Q is a catch, with which the upper edge of the long arm of the lever O engages when depressed to remove the brake-shoe from contact with the wheel N, said catch being secured to the rear edge of the table A, as shown in Figs. 1, 3, and 6.

A thin bar, *h*, is fitted to a groove formed in the under side of the rear portion of the work-plate, in a position to be struck by the pin *i* of the work-holding clamp-plate D as it is moved toward the rear of the table after the eye of the button-hole has been worked. The bar *h* has secured to its rear end the block *h'*, in which is adjustably secured the screw-pin $h^2$, in a position to come in contact with the lever O and push it from beneath the catch Q, when it is moved toward the rear by the action of said pin *i*. The block *h'* is split from the threaded hole which receives the screw-pin $h^2$ to one side, and is provided with the clamping-screw $h^3$, as shown in Figs. 1, 5, and 8.

The operation of so much of my improvements as has been described is as follows: When the work has been properly placed in the work-clamp and the clamp properly adjusted relative to the needle, the operator places the toe of the foot upon the treadle-lever L and depresses it, which causes the pulley I' to be forced into contact with the frictional surface of the leather disk *b*, which in turn is forced into contact with the disk I, thus causing the pulley I' to revolve with the shaft G. The downward motion of the treadle-lever L, acting through the rod P, causes the lever O to be moved about its pivot *e* and its long arm to be depressed so as to engage with the catch Q, which movement of the lever O causes the brake-shoe M to be removed from contact with the rim of the wheel N and compress the spring *d* in an obvious manner. These movements take place simultaneously, and the sewing commences and continues till the pin *i* has moved the bar *h* and pin $h^2$ to the rear sufficiently far to disengage the lever O from the catch Q, when the reaction of the spring *d* causes the brake-shoe M to engage with the rim of the wheel N, and at the same time, by raising the long arm of the lever O, the rod P and treadle-lever L cause the pulley I' to be removed from contact with the disk I and the motion of the machine to be stopped.

The advantage of this mechanism is that the operator does not have to use her hands to start the machine, as is the case with the machines now in common use. It has been found in practice, however, that while the stop-motions now in general use are a great improvement upon the old way of depending upon the skill of the operator to stop the machine at the desired time, they could not be relied upon to stop the machine always at the right time in the movement of the needle-bar and at the same stitch—as, for instance, if stitches were skipped or the thread or needle broke, necessitating the setting of the needle anew or the recommencing of the work at the point where the break was made, the feed-wheel was pretty sure to be thrown out of time with the needle, and in case of variations in speed, which were very liable to occur, variations in the stopping of the machine would be the result, the machine often coming to a standstill while the needle was in the work, while it was making its downward stroke, or while it was making its upward stroke, after having descended through the slit of the button-hole, either of which positions were objectionable for the reason that the operator had to move the fly-wheel against the pressure of the brake to bring the needle into proper position for commencing the work again at the desired point, the proper position for said needle to stop being when it had risen some little distance above the work, after having descended through the same and not through the button-hole.

To insure the stopping of the machine uniformly at the same point in the movement of the needle, I apply to the brake-shoe, directly or or indirectly, a locking-bolt so arranged as to lock said brake-shoe away from the fly-wheel N, and to be acted upon to release said brake-shoe by a cam arranged to make a complete revolution about its axis of motion and come in contact with said bolt once to two complete strokes or double reciprocations of the needle.

In the machine illustrated in the drawings, R is the locking-bolt, having its bearings in the ear *j* of the stand $M^2$ and on the screw *k*, set in the goose-neck B, said bolt being provided with the downwardly-projecting arm R', in front of the shaft of the fly-wheel N, as shown in Fig. 9. The rear end of the bolt R is so arranged relative to the vertical arm of the lever O that when the long arm of said lever is depressed by the treadle, so as to engage with the catch Q, and the brake-shoe has been removed from contact with the fly-wheel, said bolt will be moved backward by the spring *k'* till its rear end is interposed in the vibratory path of the short arm of said lever O, so as to prevent the brake-shoe from being moved into contact with the fly-wheel, when the lever O is released from the catch Q, until the bolt R is withdrawn from the path of the lever O.

S is a ring or collar, adjustably secured to the hub of the fly-wheel or its shaft by the set-screw *l*, and carrying the arm or pin *m*, projecting therefrom parallel to the axis of revolution of the fly-wheel, and adapted to strike the arm R' of the bolt R at each revolution of the wheel N, and move said bolt toward the front of the machine a sufficient distance to remove its rear end from the path of the vertical arm of the lever O, said collar and pin being in effect a cam for moving the bolt R R'. The ring or collar S and its arm or pin *m* may be so adjusted as to accurately time the movement of the bolt R so as to stop the machine when the needle has just left the work on its upward stroke, as before described.

In some machines the fly or driving wheel N is mounted directly upon the needle-bar-operating shaft, in which case, in order to apply my improvement, the collar S and its pin *m* would of necessity have to be applied to a different shaft from that on which the fly-wheel is mounted, as said collar and pin should make one revolution to two revolutions of the needle-bar-operating shaft.

In another application of mine, filed February 6, 1884, Serial No. 119,990, the same being a division of this case, are shown, described, and claimed certain devices for stopping the machine when the thread breaks, which devices are illustrated in the drawings in this case; but I do not claim any of said devices in this application that are claimed in said other application.

I am aware that stop-motions have been applied to button-hole sewing-machines, and operated by the work-clamp, and therefore I do not claim, broadly, a stop-motion operated by the work-clamping device; but

What I claim as new, and desire to secure by Letters Patent of the United States, is—

1. In combination with a button-hole sewing-machine provided with a vertically-reciprocating needle arranged to descend alternately through the material and through the slit of the button-hole, a fly-wheel, a brake-shoe arranged to engage with said fly-wheel, and to be pressed thereon by a spring, and to be retracted therefrom by the operator, means for automatically locking said brake in said retracted position, and mechanism arranged to operate independently of the movements of the clamping device and automatically release said brake, and adapted to be adjusted to stop the machine at any predetermined point in the movement of the needle, substantially as and for the purposes described.

2. In combination with a button-hole sewing-machine provided with a work-clamping device, the spring-pressed brake-shoe M, the elbow-lever O, the catch Q, the push-pin $h\,h^2$, the counter-shaft G, provided with tight and loose pulleys, the shipper J, and the treadle-lever I connected by the rod P to the lever O, and arranged and adapted to be depressed by the foot and thereby retract the brake-shoe and lock it, substantially as described.

3. In combination with a button-hole sewing-machine provided with a work-clamping device, the brake-shoe M, the elbow-lever O, the catch Q, the push-pin $h\,h^2$, the pin *i*, the locking-bolt R R′, and an adjustable cam arranged and adapted to be revolved about its axis and to retract the locking-bolt R R′ once to every two revolutions of the needle-operating shaft of the machine, substantially as described, for the purposes specified.

4. In a button-hole sewing-machine provided with an automatic stop mechanism, the combination of the vertically-vibrating elbow-lever O, the catch Q, the extensible push-pin $h\,h^2$, fitted to slide in a groove in the under side of the work-plate C, and the pin *i* of the work-clamping device D, as a means of operating the stop mechanism, substantially as described.

Executed at Boston, Massachusetts, this 21st day of November, A. D. 1883.

FRANK W. CROSS.

In presence of—

N. C. LOMBARD,

WALTER E. LOMBARD.